United States Patent
Nordstrom et al.

(10) Patent No.: US 8,186,378 B2
(45) Date of Patent: May 29, 2012

(54) FILTER BAND FOR AN ELECTROHYDRAULIC VALVE

(75) Inventors: Robert Scott Nordstrom, Wauwatosa, WI (US); Kirt Nathaniel Stephens, New Berlin, WI (US); Edward Aloysius Flynn, Pewaukee, WI (US)

(73) Assignee: HUSCO Automotive Holdings, LLC, Waukesha, WI (US)

( * ) Notice: Subject to any disclaimer, the term of this patent is extended or adjusted under 35 U.S.C. 154(b) by 1079 days.

(21) Appl. No.: 12/103,255

(22) Filed: Apr. 15, 2008

(65) Prior Publication Data
US 2009/0255593 A1 Oct. 15, 2009

(51) Int. Cl.
*E03B 3/18* (2006.01)
*E03B 7/07* (2006.01)
*F16K 31/06* (2006.01)

(52) U.S. Cl. .................... 137/550; 210/432
(58) Field of Classification Search .............. 137/544, 137/545, 547, 549, 550; 210/420–424, 438, 210/439, 459, 498, 429–432; 335/262
See application file for complete search history.

(56) References Cited

U.S. PATENT DOCUMENTS

| | | | |
|---|---|---|---|
| 3,788,597 A | 1/1974 | Ichioka | |
| 4,127,835 A | 11/1978 | Knutson | |
| 4,267,897 A | 5/1981 | Takeshima | |
| 4,525,695 A | 6/1985 | Sheng et al. | |
| 5,004,440 A | 4/1991 | Suzuki | |
| 5,169,524 A * | 12/1992 | Meiritz et al. | 210/232 |
| 5,238,192 A * | 8/1993 | McNair | 239/575 |
| 5,249,603 A | 10/1993 | Byers, Jr. | |
| 5,252,939 A | 10/1993 | Riefler et al. | |
| 5,482,622 A * | 1/1996 | Stark et al. | 210/232 |
| 5,807,483 A * | 9/1998 | Cassidy et al. | 210/232 |
| 6,029,704 A | 2/2000 | Kuroda et al. | |
| 6,313,726 B1 | 11/2001 | Golovatai-Schmidt et al. | |
| 6,435,472 B1 | 8/2002 | Najmolhoda et al. | |
| 6,517,718 B2 * | 2/2003 | Gutierrez et al. | 210/232 |
| 6,612,544 B2 | 9/2003 | Sakata et al. | |
| 6,640,834 B1 | 11/2003 | Hamkins et al. | |
| 6,659,121 B1 | 12/2003 | Takahashi et al. | |

(Continued)

FOREIGN PATENT DOCUMENTS

JP 06336978 A 12/1994

(Continued)

*Primary Examiner* — John Rivell
*Assistant Examiner* — Seth Faulb
(74) *Attorney, Agent, or Firm* — Quarles & Brady LLP; George E. Haas

(57) ABSTRACT

An electrohydraulic valve has a valve body with a longitudinal bore and a cylindrical exterior surface. An annular recess extends around the cylindrical exterior surface and the first port extends from the recess to the bore. A filter is formed by a plate that has a plurality of perforations and which is wrapped around valve body in the recess. The plate has a first end section at which a first tab is created and a second end section overlapping the first end section with a slot through which the first tab extends to secure the first and second end sections together. A spool is slideable into different positions within the bore of the valve body to selectively connect and disconnect the first port and a second. An actuator is operably coupled to move the spool into different positions within the bore.

18 Claims, 2 Drawing Sheets

U.S. PATENT DOCUMENTS

| | | |
|---|---|---|
| 6,848,404 B2 | 2/2005 | Maeyama et al. |
| 7,000,633 B2 * | 2/2006 | Okada et al. ................ 137/550 |
| 7,007,925 B2 | 3/2006 | Nordstrom et al. |
| 7,041,217 B1 * | 5/2006 | Close et al. .................. 210/232 |
| 7,069,947 B2 | 7/2006 | Maeda et al. |
| 7,328,773 B2 * | 2/2008 | Yamaguchi .................. 184/6.9 |
| 2005/0173006 A1 * | 8/2005 | Marcichow et al. .......... 137/549 |
| 2006/0021933 A1 * | 2/2006 | Radcliffe ..................... 210/483 |

FOREIGN PATENT DOCUMENTS

JP    2000-266235 A  *  9/2000

* cited by examiner ically operated spool valves that control flow of a fluid, and more particularly to electrical actuators, such as solenoids, for operating those valves.

FILTER BAND FOR AN ELECTROHYDRAULIC VALVE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to electrically operated spool valves that control flow of a fluid, and more particularly to electrical actuators, such as solenoids, for operating those valves.

2. Description of the Related Art

A wide variety of machines have moveable members that are operated by an hydraulic actuator. For example an internal combustion engine has a camshaft which is mechanically coupled to rotate with the crankshaft and which opens and closed cylinder intake and exhaust valves. Traditionally the camshaft timing was fixed at a setting that produced the best operation at all engine operating speeds. However, it has been recognized that engine performance can be improved if the valve timing varies as a function of engine speed, engine load, and other factors. Thus a hydraulic actuator is being used on some engines to vary the coupling relationship of the camshaft to the crankshaft and a solenoid operated valve is employed to control the application of pressurized fluid to operate the hydraulic actuator.

U.S. Pat. No. 7,007,925 discloses one type of solenoid operated valve that has been used to vary the timing of an internal combustion engine. A unique feature of this valve is that the armature assembly of the solenoid has a ball bearing which reduces resistance to movement of the armature. The armature assembly included the metal armature from which a push pin projected to engage and move a flow control spool of the valve. The ball bearing comprised a cylindrical cage that held a plurality of balls inserted through openings in one end of the cage. The cage was slid over the push pin until the openings were against the armature to retain the balls and then the cage was secured to the push member by a push-on nut. When the solenoid is assembled the armature assembly moved within a bore and the balls rolled along the surface of the bore. Although the ball bearing worked very well, it added complexity to the valve assembly process.

Therefore, it is desirable to refine the design of this type of solenoid operated valve to facilitate manufacturing.

SUMMARY OF THE INVENTION

An electrohydraulic valve comprises a body with a longitudinal bore into which a first port and a second port communicate. A spool is slideably received within the bore and has a passage that selectively connects and disconnects the first and second ports in different positions of the spool in the bore. The spool is moved within the bore by an actuator, that preferably is electrically operated.

A filter comprises a plate with a first end section and second end section and having with a plurality of perforations in the region between the end sections. At least one tab is created at the first end section. The preferred embodiment, has a pair of opposing U-shaped apertures produced in the first end section to provide a pair of tabs. A slot is formed through the plate in the second end section. The plate is wrapped around and against valve body over the first port with the second end section overlapping the first end section. Each tab projects through the slot to secure the first and second end sections together and form a band around the valve body. Preferably the one or two tabs are bent against the surface of the second end section.

DETAILED DESCRIPTION OF THE INVENTION

Figure 1:
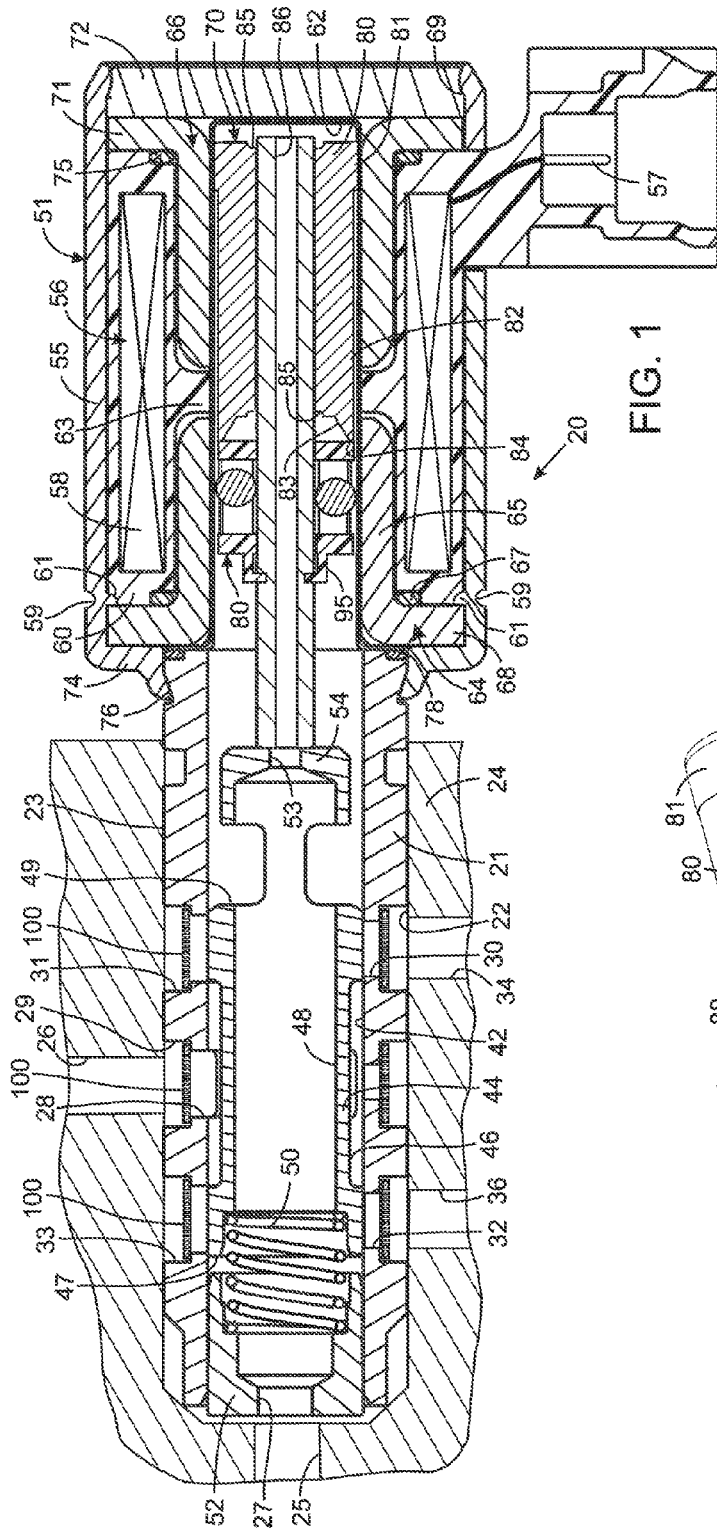
FIG. 1 is a longitudinal cross section view through an electrohydraulic valve according the present invention.

Referring to FIG. 1, an electrohydraulic control valve 20 has a tubular valve body 21 that during use is inserted into an aperture 22 in a manifold 24. The tubular valve body 21 has a longitudinal bore 42 into which a plurality of ports open. A supply passage 26 in the manifold 24 conveys pressurized fluid from a pump and a return passage 25 conveys fluid back to a tank of the hydraulic system in which the valve is incorporated. The supply passage 26 opens into an inlet port 28 of the control valve 20 and the return passage 25 at the end of the manifold aperture 22 communicates with an outlet port 27 of the valve. The inlet port 28 includes a first annular recesses 29 which is formed in an exterior curved surface 23 of the valve body 21. First and second workports 30 and 32 in the tubular valve body 21 communicate with passages 34 and 36 that lead to a hydraulic actuator being controlled. The first and second workports 30 and 32 include annular recesses 31 and 33 respectively which are formed in the exterior curved surface of the valve body 21.

A spool 44 is slideably received within the bore 42 of the valve body 21 and has an exterior annular notch 46 which, in selective positions of the spool, provides a fluid passage between the inlet port 28 and one of the two workports 30 and 32 and thus between the associated manifold passages. In a middle, or intermediate, position of the spool travel as depicted in FIG. 1, the inlet port 28 is closed from both workports 30 and 32. A central passage 48 extends between the opposite ends 47 and 49 of the spool 44. A head 54 projects from the outward end 49 of the valve spool 44 and has an aperture 53 there through. A spring 50 biases the spool 44 away from a nose piece 52 at the end of the valve body 21 at which the outlet port 27 is located.

Figure 7:
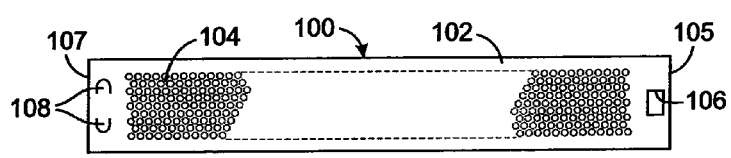
FIG. 7 illustrates a filter used in the electrohydraulic valve.

Three filters 100 are wrapped around the valve body 21 to form cylindrical bands that cover the inlet port 28 and the two workports 30 and 32. With specific reference to FIG. 7, each filter 100 is formed from a thin, flat rectangular plate 102 with a plurality of perforations 104 between the two major surfaces of the plate. For example, a standard photolithographic etching process can be employed to form perforations of a size small enough to prevent undesirable particles from entering and adversely affecting operation of the valve. A rectangular slot 106 is formed in a first end section 105 of the plate 102 and a pair of opposing U-shaped apertures are produced at the second end section 107 to form two tabs 108. Although the exemplary slot 106 is spaced from the edge of the plate 102, as an alternative the slot could be formed as a notch in the end edge of the plate.

Figure 8:
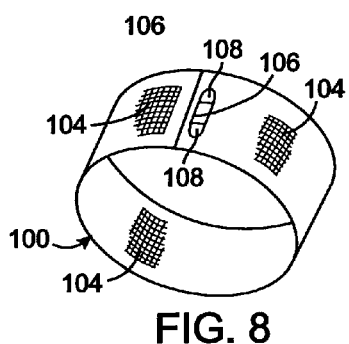
FIG. 8 shows the filter bent into a closed band as occurs upon being mounted on the electrohydraulic valve.

To install a band-shaped filter 100, the two tabs 108 are first bent perpendicular to the plate 102. Then the second end section 107 of the plate 102 is placed against the valve body 21 with the tabs 108 projecting outward. The rectangular plate 102 is wrapped around the valve body 21 in a recess 29, 31 or 33 associated with one of the ports 28, 30 or 32. The first end section 105 of the plate 102 overlaps the second end section 107 with the tabs extending through the rectangular slot 106. The tabs 108 are then bent against the surface of the first end section 105 to secure the plate in an annular band as illustrated in FIG. 8.

Figure 9:
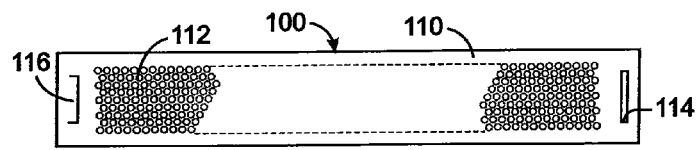
FIG. 9 illustrates another embodiment of a filter.

FIG. 9 shows an alternative plate 110 for the band-shaped filter 100. This plate 110 has a similar pattern of perforations 112. A rectangular slot 114 is formed near one end section of this plate and a single U-shaped aperture is produced in the other end section with the opening of the U facing that end of the plate 110. This U-shaped aperture defines a relatively large rectangular tab 116. When the plate 110 is wrapped around the valve body 21 with overlapping end section, the tab 116 is bent to project through the rectangular slot 114 and is bent further against the surface of the plate 110 to secure the plate in an annular band.

Referring again to FIG. 1, the valve 20 also includes a linear actuator 51 with a metal outer housing 55 that surrounds a solenoid coil 58 in a non-magnetic bobbin 60, preferably made of plastic molded around the coil. As used herein, "non-magnetic" designates an object as being neither attracted to or repelled by a magnetic field. The solenoid coil 58 is driven by a pulse width modulated (PWM) electrical signal having a duty cycle that is varied in a conventional manner to move the spool 44 to different desired positions in the valve body 21. The PWM signal is applied to the linear actuator 51 via a connector 57 formed in a lateral projection of the bobbin 60 and connected by wires to the solenoid coil 58.

The linear actuator 51 further includes two magnetically conductive pole pieces 64 and 66. The first pole piece 64 has a interior, tubular section 65 that extends into one end of the bobbin 60. An O-ring 67 provides a hermetic seal between the first pole piece 64 and the bobbin 60. The first pole piece 64 has a first flange 68 which projects outwardly from the tubular section 65 across the outer end of the valve body 21. The second pole piece 66 has a second tubular section extending into the opposite end of the bobbin 60 and has an interior end that is spaced from the first pole piece 64. An inwardly projecting annular rib 63 of the bobbin magnetically separates the first and second pole pieces 64 and 66. The outer end of the second pole piece 66 has a second flange 71 projecting outwardly and another O-ring 75 provides a hermetic seal between this flange and the bobbin 60. The solenoid coil 58, the bobbin 60, and the first and second pole pieces 64 and 66 the form a solenoid coil assembly 56.

The primary components of the solenoid coil assembly 56 are inserted through the wider open end 69 of the outer housing 55 until abutting an inwardly projecting flange 74 at the opposite end of the housing and secured in that position by stakes 61 that then are formed in the housing. The solenoid coil assembly 56 also comprises a liner tube 62, preferably of stainless steel, is inserted through the opposite housing end into the first and second pole pieces 64 and 66. The liner tube 62 provides a magnetic barrier between the pole pieces, as well as acting as a guide for a sliding actuator plunger 70. An open end of the liner tube 62 faces the valve body 21 and a closed end is adjacent the outwardly projecting flange 71 of the second pole piece 66.

A disk 72 is inserted into the wider open end 69 of the outer housing 55, which is crimped against the disk 72 to close that opening. The inwardly projecting flange 74 at the opposite end of the outer housing 55 is crimped into an annular groove 76 in the exterior surface of the valve body 21, thereby securing those components together. An O-ring 78 provides a fluid tight seal between a flange on the liner tube 62 and the valve body 21. Thus the closed liner tube 62 creates an actuator bore within the linear actuator 51 that contains the fluid passing through the valve body 21.

Figure 2:
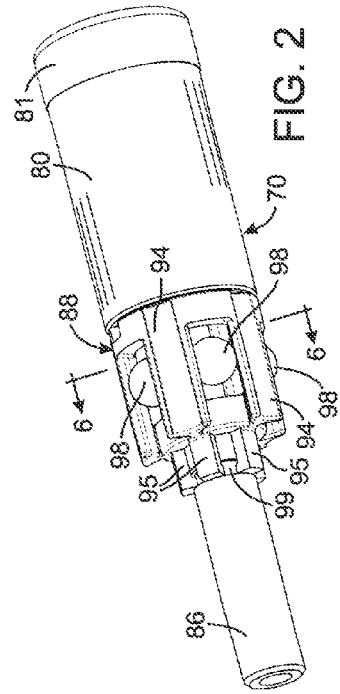
FIG. 2 is an isometric view of an actuator plunger in the valve.

Referring to FIGS. 1 and 2, the actuator plunger 70 of the linear actuator 51 is slideably located within the aperture of the liner tube 62 and includes an armature 80 of ferromagnetic material. A region 81 at the outer end portion of the armature 80 has a slightly larger diameter than the remainder of the armature so that only a relatively small surface area engages the actuator bore formed by the curved inside surface of the liner tube 62. Therefore, a gap 82 exists between most of the armature and the liner tube. By reducing this surface area of contact, resistance to the armature 80 sliding in the liner tube 62 is minimized. However, enlarging that gap 82 in this manner increases the magnetic impedance, which tends to diminish the magnetic force acting on the armature. In response, the inner end of the armature 80 has a tapered recess 83, which forms a knife edge 84 around the outer perimeter of that end. The magnetic flux flowing between the armature and the first pole piece 64 is concentrated through the region of the knife edge 84, thereby counteracting the adverse effect of the gap 82 on the electromagnetic performance of the linear actuator 51.

A tubular push member 86 is received within an aperture that extends longitudinally through the armature 80 and both ends of the armature are "ring staked" to the push member. Ring staking involves forming indentations 85 in the armature end surfaces which push armature material into the aperture and tightly against the push member 86. The push member 86 projects outward from the open end of the liner tube 62 and abuts the head 54 of the valve spool 44.

Figure 3:
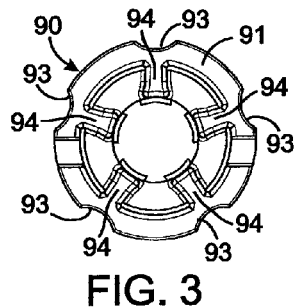
FIG. 3 shows one end of a cage that is part of the actuator plunger.
Figure 4:
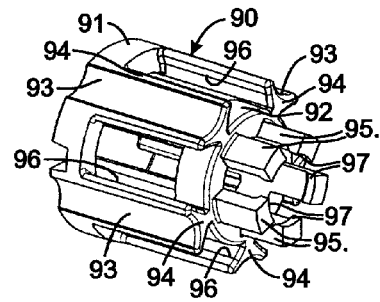
FIG. 4 is an isometric view of the cage.
Figure 5:
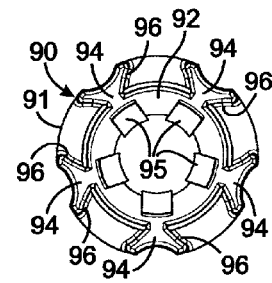
FIG. 5 is a plan view of another end of the cage.

The actuator plunger 70 further includes a bearing 88 mounted on the push member 86 against the armature 80. An axial force is applied to the actuator plunger 70 by the magnetic flux at the end of the first pole piece 64 and bearing 88 at this location prevents binding of the armature due to that axial force. With additional reference to FIGS. 3-5, the bearing 88 comprises a cage 90 fabricated of a non-magnetic material, preferably a resilient plastic. The cage 90 is a single piece with two spaced-apart end rings 91 and 92 between which five walls 94 extend, equidistantly spaced around the cage. Each wall 94 has a somewhat Y-shaped cross section, as seen in the cross section of FIG. 6, so as to be wider at the outer curved surface of the cage 90 than toward the center of the cage. Five longitudinal slots 96 are formed between adjacent ones of the five walls 94. The outer surfaces of the walls 94 are concave forming longitudinal channels 93 that extend the entire length of the walls. These channels 93 allow fluid to flow around the cage 90 which reduces resistance to the sliding motion of the actuator plunger 70 that would otherwise occur due to restricted fluid flow.

Figure 6:
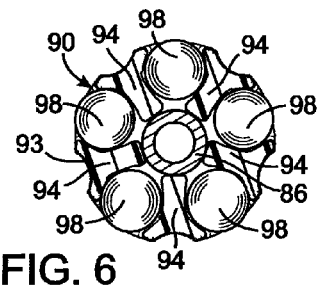
FIG. 6 is a cross sectional view taken along line 6-6 in FIG. 2.

As shown in FIGS. 1, 2 and 6, a separate chromium plated sphere 98 provides a rollable element in each slot 96. The top of each generally Y-shaped wall 94 spreads into each slot 96 thereby narrowing the slot opening in the exterior curved surface of the cage so that the spheres 98 are captured and cannot freely exit the slot. The plastic material of the cage 90 is resilient allowing adjacent walls 94 to be spread apart enough to allow insertion of a sphere 98 into the associated slots 96 and then return to their original positions to retain the sphere. The rings 91 and 92 at each end of the cage prevent the spheres 98 from traveling out the ends of the slots. The term "captured" as used herein means that the spheres 98 are retained by the walls 94 and rings 91 and 92 of the cage without requiring other components as in prior actuator plunger designs. As seen in FIG. 1, each sphere 98 projects from the respective slot into contact with the liner tube 62 and is able to roll within the respective slot 96. Other forms of rollable elements, such as cylinders, may be used in place of the spheres 98.

With particular reference to FIG. 2, the cage 90 has a latch that comprises five L-shaped fingers 95 project outwardly from the second ring 92 with tabs 97 that protrude into an annular groove 99 around the push member 86. Engagement of the finger tabs 97 with the push member's annular groove 99 retains the cage 90 against the armature 80. Alternatively, the cage 90 and the push member 86 can be fabricated as a single plastic part.

Referring again to FIG. 1, the control valve 20 is fabricated by placing the solenoid coil 58 in a mold into which molten plastic for the bobbin 60 is injected to encapsulate the solenoid coil. After that molded assembly has hardened, the first pole piece 64 along with the inner O-ring 67 and the second pole piece 66 with the outer O-ring 75 are placed into opposite ends of the bobbin. That combination then is inserted into the outer housing 55. A tool is driven against the exterior surface of the outer housing 55 which creates dimples 59 in that surface and forces some of the metal of the housing into the bobbin 60 in the form of stakes 61 than hold the first pole piece 64 within the outer housing. The disk 72 is positioned in the open end of the outer housing 55 and crimped in place. The liner tube 62 is inserted into the other end of the first pole piece 64 and the actuator plunger 70 is slid into the liner tube 62, thereby completing assembly of the linear actuator 51.

The valve components then are assembled into the valve body 21 and the nose piece 52 is pressed into the valve body to provide a spring preload. The linear actuator 51 is placed on the end of the valve body 21 with O-ring 78 between the valve body 21 and the flange of the liner tube 62 to provide a hydraulic seal. Then, the flange 74 is crimped into an annular groove 76 in the valve body 21 securing the linear actuator 51 to the valve body 21.

When the electrohydraulic valve 20 in FIG. 1 is not activated by electric current applied to the solenoid coil 58, the spring 50 forces the spool 44 into a position at which the annular notch 46 provides a fluid passage between the inlet port 28 and the first workport 30 leading to the first manifold passage 34. In this de-energized state, the inner end 47 of the spool 44 is positioned to the right which opens a path between the outlet port 27 and the second workport 32 communicating with the second manifold passage 36. Pressurized fluid now is fed through the supply passage 26 to first workport 30 and fluid is drained from second workport 32 to the return passage 25.

From the de-energized state, application of a relatively small magnitude electric current to the solenoid coil 58 produces movement of the armature 80 and push member 86 toward the nose piece 52. This motion also moves the spool 44 to the left in FIG. 1, thereby reducing the size of the fluid paths described immediately above. This decreases the flow of fluid between the various valve ports.

Application of a greater magnitude electric current to the solenoid coil 58 eventually moves the spool 44 farther leftward into an intermediate position depicted in FIG. 1, closing the previous paths between the inlet port 28 and the first workport 30 and between the outlet port 27 and the second workport 32. This terminates all fluid flow through the control valve 20.

Alternatively, the annular spool notch 46 in the valve body 21 can be configured so that in this intermediate position the first and second workports 30 and 32 both communicate with the inlet port 28. This applies equal pressure to both the first workport 30 and the second workport 32.

Referring still to FIG. 1, applying a still greater magnitude electric current to the solenoid coil 58 causes the spool 44 to move farther to the left into a position where the first workport 30 communicates with the central passage 48 through the spool 44. This opens a fluid path between the first workport 30 and the outlet port 27. In this position, the annular notch 46 around the spool 44 provides a passage between the inlet port 28 and only the second workport 32. This applies pressurized fluid from supply passage 26 to the second workport 32 and drains the fluid from the first workport 30 to the return passage 25. The size of the openings between these passages is varied by controlling magnitude of the electric current applied to the solenoid coil 58 to meter the flow of fluid and thus control the rate at which valve timing changes.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An electrohydraulic valve comprising:
a valve body with an exterior surface and a longitudinal bore, the valve body having a first port and a second port in communication with the bore;
a filter comprising a plate that is a single piece of material with a plurality of perforations and wrapped around valve body over the first port, the plate having a first end section at which a first tab is formed and having a second end section overlapping the first end section with a slot through which the first tab extends and bends against a surface of the second end section to secure the first and second end sections together;
a spool slideable into different positions within the bore of the valve body thereby selectively connecting and disconnecting the first and second ports; and
an actuator operably coupled to move the spool into different positions within the bore.

2. An electrohydraulic valve comprising:
a valve body with an exterior surface and a longitudinal bore, the valve body having a first port and a second port in communication with the bore;
a filter comprising a plate with a plurality of perforations and wrapped around valve body over the first port, the plate having a first end section at which a first tab is formed and having a second end section overlapping the first end section with a slot through which the first tab extends to secure the first and second end sections together, wherein the first tab upon extending through the slot is bent against a surface of the second end section;

a spool slideable into different positions within the bore of the valve body thereby selectively connecting and disconnecting the first and second ports; and an actuator operably coupled to move the spool into different positions within the bore.

3. The electrohydraulic valve as recited in claim 1 further comprising a second tab formed at the first end section and extending through the slot in the second end section.

4. The electrohydraulic valve as recited in claim 1 wherein the valve body has an annular recess in the exterior surface and the filter residing in the annular recess.

5. The electrohydraulic valve as recited in claim 1 wherein the actuator comprises a solenoid coil assembly with a coil aperture therein and comprising an armature slideably received in the coil aperture, and a push member projects from the armature into engagement with the spool, the actuator further includes a cage and a plurality of rollable elements held in the cage;

wherein the cage comprises a first ring and a second ring spaced apart with a plurality of walls extending there between and forming a plurality of slots between adjacent walls within which the plurality of rollable elements is captured.

6. The electrohydraulic valve as recited in claim 5 wherein the cage is formed of non-magnetic material.

7. The electrohydraulic valve as recited in claim 5 wherein the cage further comprises a latch that engages at least one of the push member and the armature to fasten the cage to the push member.

8. The electrohydraulic valve as recited in claim 5 wherein the push member has a groove therein; and the cage further comprises a finger projecting therefrom and received in the groove to hold the cage on the push member in a fixed position.

9. The electrohydraulic valve as recited in claim 5 wherein the plurality of rollable elements are spheres.

10. An electrohydraulic valve comprising:

a cylindrical valve body with a longitudinal bore and having a curved surface through which an inlet port, a first workport, and a second workport extend to the bore;

three filters each comprising a plate that is a single piece of material wrapped around cylindrical valve body in contact with the curved surface over a different one of the-inlet port, the first workport, and the second workport, wherein the plate of each filter has a first end section at which a first tab is formed and has a second end section overlapping the first end section with an slot through which the first tab extends, the tab being bent against a surface of the second end section to secure the first and second end sections together;

a spool slideably received within the bore of the valve body and having at least one passage for connecting the inlet port selectively to the first and second workports in different positions of the spool in the bore; and an actuator operably coupled to move the spool into different positions within the bore.

11. The electrohydraulic valve as recited in claim 10 further comprising a second tab formed at the first end section and extending through the slot in the second end section.

12. The electrohydraulic valve as recited in claim 11 wherein the first tab and the second tab are bent against a surface of the second end section.

13. The electrohydraulic valve as recited in claim 10 wherein the cylindrical valve body has three annular recesses in the curved surface, a different one of the three filters residing in each annular recess.

14. The electrohydraulic valve as recited in claim 10 wherein the actuator comprises a solenoid coil assembly with a coil aperture therein and comprising an armature slideably received in the coil aperture, and a push member projecting from the armature into engagement with the spool, the actuator further includes a cage and a plurality of rollable elements held in the cage;

wherein the cage is a single piece that comprises a first ring and a second ring spaced apart with a plurality of walls extending there between and forming a plurality of slots between adjacent walls within which the plurality of rollable elements is captured.

15. The electrohydraulic valve as recited in claim 14 wherein the cage is formed of non-magnetic material.

16. The electrohydraulic valve as recited in claim 14 wherein the cage further comprises a latch that engages at least one of the push member and the armature to fasten the cage to the push member.

17. The electrohydraulic valve as recited in claim 14 wherein the push member has a groove therein; and the cage further comprises a finger projecting therefrom and received in the groove to hold the cage on the push member in a fixed position.

18. The electrohydraulic valve as recited in claim 14 wherein the plurality of rollable elements are spheres.

* * * * *